United States Patent [19]

Pascher

[11] Patent Number: 5,542,019
[45] Date of Patent: Jul. 30, 1996

[54] OPTICAL CABLE AND PROCESS FOR THE MANUFACTURE THEREOF

[75] Inventor: Helmut Pascher, München, Germany

[73] Assignee: Siemens Aktiengesellschaft, Munich, Germany

[21] Appl. No.: 256,098

[22] PCT Filed: Feb. 18, 1993

[86] PCT No.: PCT/DE93/00143

§ 371 Date: Jun. 24, 1994

§ 102(e) Date: Jun. 24, 1994

[87] PCT Pub. No.: WO93/18423

PCT Pub. Date: Sep. 16, 1993

[30] Foreign Application Priority Data

Mar. 3, 1992 [DE] Germany .............. 42 06 653.0

[51] Int. Cl.⁶ .................................................. G02B 6/44
[52] U.S. Cl. ........................... 385/105; 385/103; 385/114
[58] Field of Search ......................... 385/100, 102, 385/103, 105, 106, 109, 110, 112, 114

[56] References Cited

U.S. PATENT DOCUMENTS 5,013,126  5/1991  Hattori et al. ................... 385/103
5,193,134  5/1993  Pizzorno et al. ................. 385/105

FOREIGN PATENT DOCUMENTS

| 2549235 | 1/1985 | European Pat. Off. . |
|---|---|---|
| 0295130 | 12/1988 | European Pat. Off. . |
| 0495400A3 | 7/1992 | European Pat. Off. . |
| 3839109A1 | 5/1990 | Germany . |
| 63-50806 | 3/1988 | Japan .................... 385/114 |
| 4-30110 | 2/1992 | Japan .................... 385/114 |
| 2040063 | 8/1980 | United Kingdom . |

*Primary Examiner*—Rodney B. Bovernick
*Assistant Examiner*—Sanghavi Hemang
*Attorney, Agent, or Firm*—Hill Steadman & Simpson

[57] ABSTRACT

Supporting elements (SE1–SEn) are provided between chamber elements (KE1–KEn) of an optical cable (OC1), which are disposed annularly in at least one layer. These supporting elements extend substantially in a radial direction, in which case their radial extent is selected to be at least equal to the radial extent of the chamber elements (KE1–KEn).

37 Claims, 6 Drawing Sheets

OPTICAL CABLE AND PROCESS FOR THE MANUFACTURE THEREOF

BACKGROUND OF THE INVENTION

1. Field of the Invention

The present invention relates to an optical cable having chamber elements which are disposed annularly in at least one layer and which serve to receive optical waveguides.

2. Description of the Related Art

An optical cable is disclosed in German Patent Application 3,839,109. Its cable core comprises a plurality of chamber elements to receive optical waveguides.

A disadvantage of an optical cable constructed in this manner resides principally in that the dimensioning and shaping of the known chamber elements alone determine the strength of the construction of the cable core. If there is excessively great radial load, there may possibly be the danger of deformating the chamber elements and possibly of damage to the optical waveguides embedded in them. With respect to the bending of the side walls, in the case of the conventional design the danger of deformation cannot be substantially reduced, as the maximum bending moment occurs at a position of the side wall of the U profile at which position, of course, least space is available for strengthening, namely inside. An integration of the supporting function into the chamber elements would lead to a marked asymmetry of the chamber elements, which could make the manufacture of the chamber profiles and their interstratification on spools in the production sequence more difficult, especially as the transverse dimensions of the chambers are relatively critical for the strip stack.

SUMMARY OF THE INVENTION

An object of the invention is to provide an optical cable having chamber elements, in which the strength of the construction of the cable core is improved in a simple and reliable manner.

In the case of an optical cable of the initially mentioned type, this and other objects and advantages are achieved in that supporting elements are provided between the chamber elements, in that the supporting elements are disposed so as to extend substantially radially, and in that the radial extent of the supporting elements is selected to be at least equal to the radial extent of the chamber elements.

The invention is distinguished especially in that the supporting elements between the chamber elements act as supporting pillars against radial and transverse forces. In the case of the invention, it is thus not necessary that the chamber elements alone determine the strength and stiffness of the construction of the cable core. The latter properties of the cable structure are predominantly ensured by the resistance and supporting function of the supporting elements against transverse and radial forces, i.e. the compressive strength and stiffness of the cable are substantially provided by the supporting elements. In this way, the chamber walls of the chamber elements can be relatively thin, i.e. of a filigree thickness. On account of their reduced stiffness and strength, e.g. filigree chamber elements exhibit a substantially improved bending capability. In addition, an enhanced elasticity of the chamber elements facilitates their handling during the stranding process, especially in the processing of very great run lengths of the chamber elements. The supporting elements between the chamber elements can be stranded in a simple manner together with the chamber elements in a single operation.

According to an expedient further development of the invention, the supporting elements exhibit in each instance at least one transversely extending projection. As a result of this, it is achieved that at least the intermediate spaces between the chamber elements, i.e. the fillers in the cable core or/and even the chamber elements, can be completely or partly covered over. Thus, the additional application of a cover layer on the chamber elements can possibly be saved, or this cover layer can be designed in a substantially simpler or thinner configuration.

Present invention also provides a process for the manufacture of an optical cable, which is characterized in that the chamber elements are disposed annularly in at least one stranding layer, and in that the supporting elements between the chamber elements are inserted extending radially from outside.

Other further developments of the invention are provided in an optical cable characterized in that the layer of chamber elements and the supporting elements are disposed annularly about a core member element. This core member element may include at least one tensile element. Preferably, a thickening layer is applied to the tensile element. Alternatively, the core member element is designed as a tube, and at least one optical waveguide is disposed in the tube.

In the optical cable, the chamber elements may be of a U-shaped profile in cross-section. The chamber elements may have approximately rectangular openings to receive the optical waveguides. Generally, the chamber openings of the chamber elements are directed radially outwardly. At least one optical waveguide strip line is inserted into the chamber elements, and preferably, a stack of a plurality of optical waveguide strip lines is inserted into the chamber elements.

In a preferred embodiment, the chamber elements are of a radial extent which is selected to be at least 1 mm, preferably between 3 and 10 mm, and an extent along the circumference of at least 2 mm, preferably between 3 and 10 mm. The wall thickness of the chamber elements is selected to be between 0.3 mm and 1 mm. In one embodiment, the radial extent of the supporting elements is selected to be substantially greater than their wall thickness. The supporting elements exhibit a substantially smaller wall width than the extent of the chamber elements in the circumferential direction. The radial extent of the supporting elements is selected to be greater than the radial extent of the chamber elements. In an exemplary embodiment, the wall thickness of the supporting elements is selected to be between 0.5 mm and 2 mm.

The optical cable may include outer walls of the supporting elements which touch the outer walls of the adjacent chamber elements. Preferably, the outer walls of the supporting elements rest against the outer walls of the adjacent chamber elements along their full length. The wall thickness of the supporting elements increases in an outward direction. The supporting elements fill out to a large extent the fillers between the chamber elements of one embodiment, while the supporting elements fill out only partially the fillers between the chamber elements. Advantages are provided when a harder material is used for the supporting elements than for the chamber elements.

Generally, at least one transversely extending projection is provided at the supporting elements, in each instance. More specifically, in each instance two projections extending in opposite directions are provided at the supporting elements. The projections are disposed symmetrically with respect to the radial extent of the supporting elements. The extent of the projections is selected so that the openings of the chamber elements are covered over in one embodiment. In one version, at least two projections form a continuous bridge component. The projections abut one another, as seen in the circumferential direction. Generally, the wall thickness of the projections is selected to be between 0.5 mm and 2 mm.

The optical cable has a plurality of layers, chamber elements and supporting elements. An intermediate layer is applied in each instance on a layer of chamber elements and supporting elements. The supporting elements are designed differently in the various layers. Externally, at least one outer jacket and/or at least one armoring is provided. The radially extending middle parts of the supporting elements and/or the projections exhibit differing mechanical properties within their cross section or with respect to one another. The supporting elements exhibit a fixing with the core member element in their foot regions.

A process for the manufacture of an optical cable is characterized in that the chamber elements are disposed annularly in at least one stranding layer, and in that the supporting elements are inserted from outside extending radially between the chamber elements. The process includes at least one outer jacket and/or an armoring being applied externally by extrusion. After the arranging of the chamber elements, the optical waveguide strip lines are inserted into the latter as a stack, and subsequently the chamber elements are closed by application of the supporting elements provided with projections.

BRIEF DESCRIPTION OF THE DRAWINGS

The invention and its further developments are explained in greater detail hereinbelow with reference to drawings.

In the drawings.

DETAILED DESCRIPTION OF THE PREFERRED EMBODIMENTS

Figure 1:
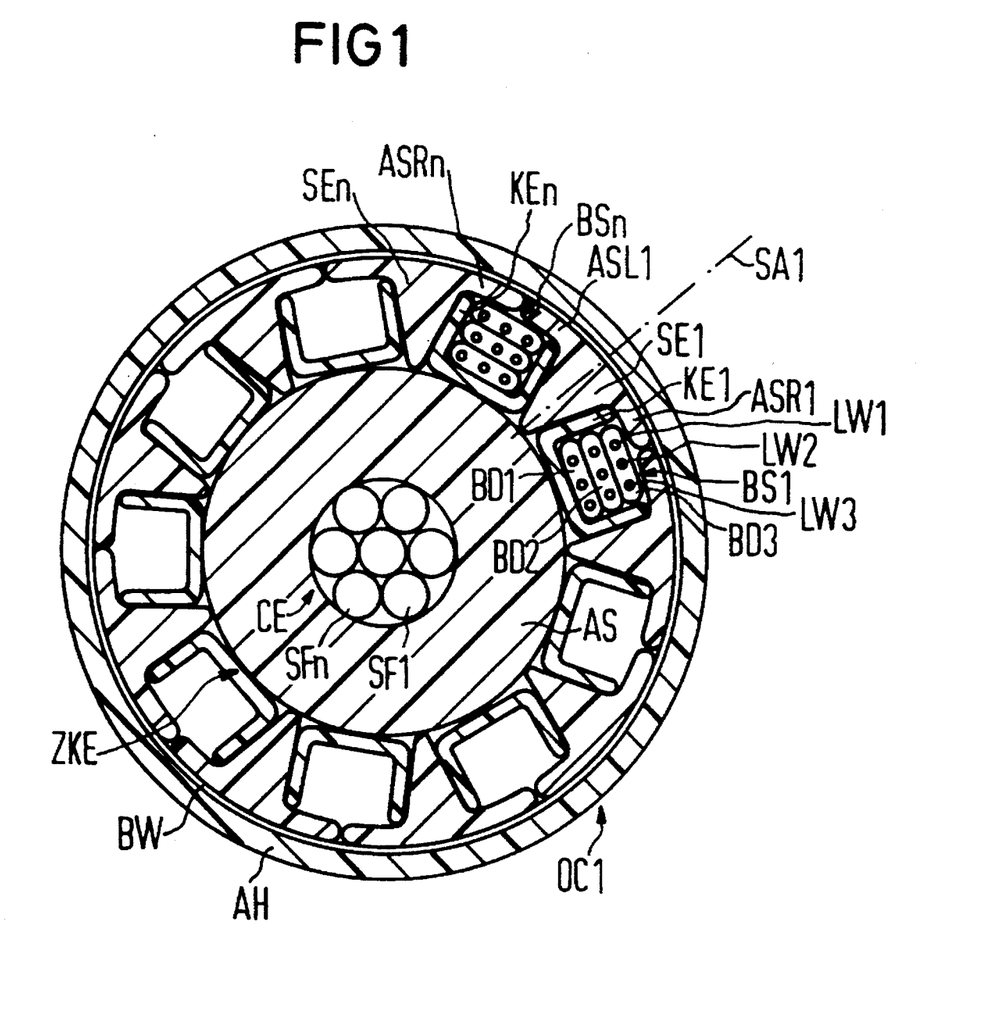
FIG. 1 shows, in cross section, in an enlarged representation, an optical cable according to the invention with a layer of chamber elements and supporting elements lying there between, FIG. 2 shows, in cross section, a modification of the optical cable according to FIG. 1, with a tubular core member element.

FIG. 1 shows, in cross section, an optical cable OC1 having a core member element ZKE, having a layer, applied to the latter, of chamber elements KE1 to KEn, having supporting elements SE1 to SEn inserted between these and having an outer sheathing of an armoring BW and an outer jacket AH.

The core member element ZKE exhibits, in its center, an element CE, which is tension resistant and crush resistant, as core member, in order to make the optical cable OC1 insensitive to tensile and crushing stresses. The tension resistant element CE can be advantageously constructed for example from a plurality of steel or aramid fibers SF1–SFn. A thickening layer AS is applied to this tension resistant and crush resistant element CE. The thickening layer is dimensioned so that the diameter of the core member element ZKE is sufficient to dispose a desired number of chamber elements KE1 to KEn annularly in a layer about the thickening layer AS. For the thickening layer AS, expediently a harder material is used than for the chamber elements KE1 to KEn, such as for example advantageously HDPE, PC or PB.

In this way, it is ensured that the core member element ZKE represents a stiff, crush resistant base for the layer, disposed directly on it, of chamber elements KE1 to KEn and of the supporting elements SE1 to SEn which are incorporated therebetween.

The chamber elements KE1 to KEn are disposed annularly as closely as possible or directly adjoining on the core member element ZKE by stranding in a layer. The chamber elements KE1 to KEn in FIG. 1 exhibit, in cross section, preferably approximately a U-shaped profile with in each instance a radially outwardly directed opening to receive approximately rectangular strip stacks BS1 to BSn. To receive optical waveguide strip lines, chamber elements KE1 to KEn with approximately rectangular openings are also preferably suitable. In FIG. 1, for the sake of clarity, only the chamber elements KE1 and KEn, associated optical waveguide small strip stacks BS1 and BSn and the supporting elements SE1 and SEn have been provided with reference symbols. For this reason, their dimensions have been shown enlarged. The remaining chamber elements and supporting elements are constructed and disposed in a similar way. In FIG. 1, by way of example, in the chamber element KE1 three approximately rectangular strip lines BD1 to BD3 are combined into one approximately rectangular strip stack BS1; in this case, no or only a narrow gap is left free on the outside against the chamber walls. On account of the U-shaped cross-sectional shape of the chamber element KE1, the approximately rectangular strip stack BS1 is secured in position, seen in the circumferential direction; in this case, the side walls of the chamber element KE1 engage around the outer walls of the strip stack BS1 in boxlike fashion. In order to assist the retaining action of the chamber element KE1 on the three strip lines BD1 to BD3, i.e. to prevent a sliding of the three strip lines BD1 to BD3 in the stack BS1, these may possibly be adhesively bonded with a lightly adhering filling compound to one another and into the chamber element KE1. At the same time, it is possible by means of this measure to achieve a certain longitudinal waterproofness, if appropriate. The side walls of the U-shaped chamber elements KE1 to KEn can expediently project somewhat beyond the rectangular strip stacks BS1 to BSn. Similar considerations also apply to the remaining chamber elements.

In an optical waveguide strip line, it is possible expediently to provide between 2 and 20 optical waveguides. Between 1 and 20 strip lines can advantageously be combined into one strip stack. If required, it can also be expedient to insert optical waveguides in a loose condition or preferably combined into approximately rectangular bundles, into the chamber elements KE1–KEn.

Expediently, a radial extent of the chamber elements KE1 to KEn of at least 1 mm, preferably between 3 and 10 mm, and an extent along the circumference of at least 2 mm, preferably between 3 and 10 mm, are selected.

Since the chamber elements KE1 to KEn perform substantially only a position securing function with regard to the strip stacks BS1 to BSn, they can advantageously be designed in a relatively filigree-like configuration. This offers the advantage of an almost optimal utilization of the cross section of the chamber elements KE1 to KEn, since these no longer need to provide a carrying function, but are only intended to secure the strip stacks in their position. At the same time, the increased flexibility of the chamber elements KE1 to KEn permits certain compensating movements and deformations of the chamber elements KE1 to KEn in the circumferential direction and in the radial and axial direction in the event of occurrences of bending, compressive, buckling, tensile and/or torsional stresses. For this reason, the chamber elements KE1 to KEn can expediently have a wall thickness of only between 0.3 mm and 1 mm. For the chamber elements KE1 to KEn, it is particularly advantageous to use a dimensionally stable, in this case elastic material such as for example PC, PBTP or PA.

The supporting elements SE1 to SEn are disposed by insertion from outside, such as for example by means of a stranding process, between in each instance two adjacent chamber elements KE1 to KEn. They preferably exhibit an approximately T-beam-shaped cross sectional shape. The radial extent of their middle part (the foot of the T-beam) is in this case selected to be substantially greater than the extent of their middle part in the circumferential direction, i.e. their wall thickness. At the outer ends of the supporting elements SE1 to SEn, there are provided in each instance two symmetrical projections. In the case of the supporting element SE1, the symmetrical projections are designated by ASL1 and ASR1. These symmetrical projections ASL1 and ASR1 extend transversely to the radially extending plane of symmetry SA1 in opposite directions, i.e. in the circumferential direction. In comparison with the wall thickness of the chamber elements KE1 to KEn, the supporting element SE1 to SEn expediently exhibit a greater wall thickness, in particular between 0.5 mm and 2 mm. Expediently, the supporting elements SE1 to SEn exhibit a substantially smaller wall width than the extent of the chamber elements KE1–KEn in the circumferential direction. The supporting elements SE1 to SEn extend in the radial direction at least as far as the chamber elements KE1 to KEn. Particularly advantageously, the radial extent of the supporting elements SE1 to SEn is selected to be greater than the radial extent of the chamber elements KE1 to KEn and specifically by 1 mm to 2 mm. By means of this measure, it is achieved that the supporting elements SE1 to SEn absorb radially acting transverse compressive forces as supporting pillars. This mechanism is achieved in particular in conjunction with the core member element ZKE acting as a crush resistant base. If, by way of example, a transverse compressive force acts radially inwardly on the supporting element SE1, then essentially by the direct resting of the supporting element SE1 on the core member element ZKE this force is conducted away radially inwardly to the core member element ZKE, without causing a crushing of the chamber elements KE1 to KEn and of the strip stacks BS1 to BSn incorporated in the chambers. To assist the pillar and supporting action of the supporting elements SE1 to SEn, it is advantageous to use for the supporting elements an at least equally hard material as for the chamber elements KE1 to KEn. PC, PA, PP and HDPE are expediently suitable as materials. The range of possible selections is somewhat greater, since less stringent requirements of consistency in length need to be imposed where the supporting elements are concerned, as compared with the chamber elements.

The outer walls of the supporting element SE1 expediently contact the outer walls of the two adjacent chamber elements KE1 and KEn in the region of the bearing surface of the supporting element SE1 on the core member element ZKE. Advantageously, the outer walls of the supporting elements SE1 to SEn rest against the outer walls of the adjacent chamber elements KE1–KEn along their full length. As a result of this, the chamber elements KE1 to KEn are fixed around the circumference to a certain extent in their places, i.e. a certain positional fixing of the chamber elements KE1 to KEn is achieved. Since the fillers between the chamber elements KE1 to KEn broaden radially outwardly in a V-shape, the wall thickness of the supporting elements SE1 to SEn expediently also increases towards the outside, in order to fill out the empty space as far as possible and thus to support the filigree side walls of the chamber elements KE1 to KEn, i.e. the supporting elements SE1–SEn fill out the fillers between the chamber elements KE1–KEn advantageously to a large extent.

The symmetrical projections of the T-beam-shaped supporting elements SE1 to SEn extend around the circumference in each instance expediently to the center of the adjacent chamber element. Since the arrangement is a symmetrical arrangement of chamber elements KE1 to KEn and supporting elements SE1 to SEn, the ends of the projections of adjacent supporting elements SE1 to SEn abut one another in each instance in the center of a corresponding chamber element KE1 to KEn. Thus, the projections of the supporting elements SE1–SEn cover the radially outwardly open chamber elements KE1 to KEn around the circumference in an outward direction and form a closed annular structure also termed a (supporting ring). The supporting elements SE1 to SEn act in a similar way to T-beams as pillar elements and form cavern-like, transverse pressure-resistant coverings for the filigree chamber elements KE1 to KEn. If now a radially acting force attacks the projections ASL1 or/and ASR1, acting as coverings, of the supporting element SE1, then this force cannot or can only to a slight extent act on the adjacent filigree chamber elements KE1 and/or KEn to damage the chamber elements. At the same time, the projections of the supporting elements SE1 to SEn act in the manner of covers for the radially outwardly open chamber elements KE1 to KEn. These prevent the strip stacks BS1 to BSn in the chamber elements KE1 to KEn from leaving the chambers in the event of occurring buckling, bending, torsional and compressive stresses. The projections advantageously exhibit a wall thickness between 0.5 mm and 2 mm, in order to guarantee a sufficient protection against transverse compressive forces.

It may possibly already be sufficient for a supporting pillar function of the supporting elements SE1–SEn that these only in part fill out the intermediate spaces thereby forming (fillers) between the chamber elements KE1–KEn. Accordingly, the supporting elements SE1–SEn are inserted between in each instance two adjacent chamber elements with a free space on both sides. The supporting elements SE1–SEn in the intermediate spaces then serve principally as radially extending spacers or supporting pillars against radially acting forces. For this purpose, a stiff, smooth material is advantageously selected for the supporting elements SE1–SEn. Advantageously, this type of supporting elements SE1–SEn surmounts the chamber elements KE1–KEn approximately by 0.5–1 mm. In conjunction with their stiffness, even in the event of radially acting forces, a defined spacing between the chamber elements KE1–KEn and the projections, serving as a covering, of the supporting elements SE1–SEn or of an additionally externally applied cover layer is by this means ensured to a large extent. Thus, advantageously a free crushable space is available as a safety zone. In order to prevent this type of supporting elements SE1–SEn from being displaced or being tilted-over eg. immediately after stranding, the supporting elements SE1–SEn can expediently be fixed in their positions. This can in particular take place in that the supporting elements SE1–SEn are adhesively bonded onto the core member element ZKE or are set in depressions prepared therein. It is also possible to provide external grooves on the core member element ZKE into which the supporting elements SE1 to SEn engage by their foot regions. Particularly advantageously, the supporting elements SE1–SEn are prevented from being tilting over by the supporting ring action of their mutually abutting projections, which form a closed annular structure.

The supporting elements SE1–SEn can advantageously exhibit differing mechanical properties distributed over their cross sections. By way of example, the supporting elements SE1–SEn can in each instance in the interior of their radially extending middle part (at the foot of the T-beam) comprise very hard, stiff material, while the lateral wall parts directed towards the chamber elements KE1–KEn can comprise a softer material and can possibly even exhibit cushioning properties. Furthermore, the projections ASL1–ASRn of the supporting elements SE1–SEn can exhibit differing mechanical properties as compared with the radially extending middle parts of the supporting elements SE1–SEn. Furthermore, it is possible to embed in the interior of the radially extending middle part (at the foot of the T-beam) of the supporting elements SE1–SEn and/or in the projections ASL1–ASRn strand- or band-shaped elements with differing mechanical properties as compared with the middle part of the supporting elements and/or the projections. By way of example, radially extending strips of harder material can be incorporated in each instance at the center of the radially extending middle part of the supporting elements SE1–SEn, which strips give an improvement of the supporting function. Advantageously, strips or the like extending substantially in the circumferential direction can also be embedded at the projections ASL1–ASRn. Seen overall, the middle parts of the supporting elements SE1–SEn and/or their projections ASL1–ASRn can exhibit differing mechanical properties within their cross section or also with respect to one another.

At the same time, these supporting elements SE1 to SEn which have been inserted between the chamber elements KE1 to KEn offer, as well, a certain protection against transverse forces which act on the side walls of the chamber elements KE1 to KEn transversely to their radial extent. Since the supporting elements SE1 to SEn are incorporated in each instance between the radially extending outer walls of the chamber elements KE1 to KEn, these transverse forces are at least to a certain extent prevented from acting directly on the adjacent chamber element KE1 to KEn. They are to a large extent absorbed by the supporting elements SE1 to SEn and conducted away to the core member element ZKE. Thus, the supporting elements SE1 to SEn act between the relatively soft, flexible and filigree side walls of the chamber elements KE1 to KEn, on account of their harder and stiffer material, as cross beams and impart to the annular layer of chamber elements KE1 to KEn firstly a certain stiffness and crush strength. The resistance of the construction to transverse forces is at the same time assisted by the projections of the supporting elements SE1 to SEn (supporting ring), which projections abut one another, as seen around the circumference. Thus, the projections of the supporting elements SE1 to SEn function not only as coverings of the radially outwardly open chamber elements KE1 to KEn against radially acting compressive forces, but serve to distribute transverse compressive forces around the circumference among a plurality of supporting elements SE1 to SEn (as a supporting ring).

At the same time, the closed covering formed by the projections of the supporting elements SE1 to SEn forms an annular intermediate layer around the circumference. In order to protect against mechanical stresses, if required, an armoring BW and/or a multilayer outer jacket AH can be fitted onto this intermediate layer.

Accordingly, in the case of this construction the supporting and carrying function is essentially or even entirely allocated to the supporting elements SE1–SEn. On the other hand, as against that, the chamber elements KE1–KEn are hardly mechanically stressed at all and form autonomous elements, which can be manufactured independently thereof and can be inserted and also can be displaced in the finished state and which serve only for the simple preservation of the strip stacks BS1–BS11. It is not necessary for them to perform a carrying or supporting function beyond this.

Figure 2:
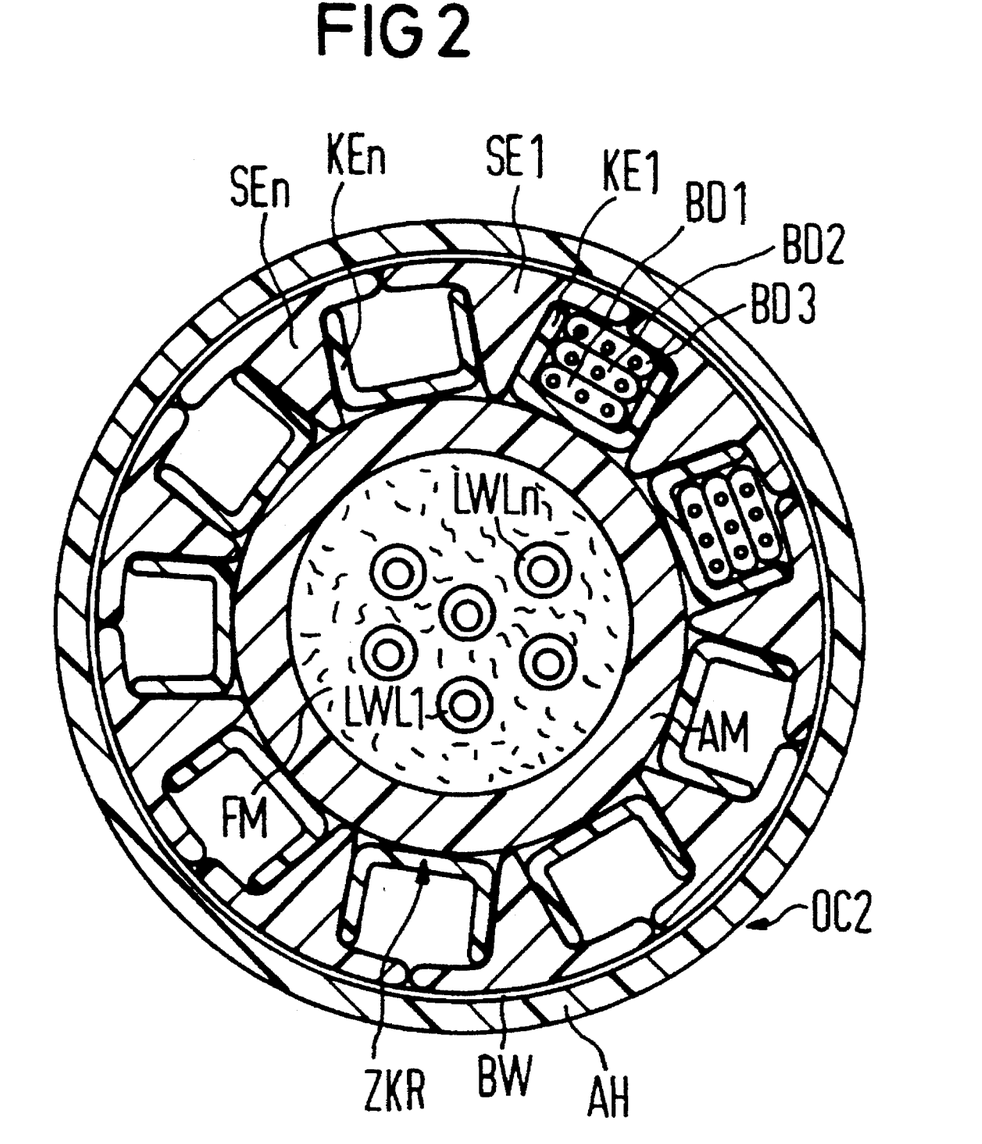

In FIG. 2, by way of a modification in relation to FIG. 1, the core member element of the optical cable OC2 is designed as a tube ZKR. The elements of the above-described embodiment which have been used in unchanged form are provided with the same reference symbols as in FIG. 1. This tube ZKR is formed by the outer sheath AM of an optical transmission element, which includes a plurality of optical waveguides LW1 to LWn, preferably enclosed in a filling compound FM. In order to ensure a sufficient strength of the construction of the cable core, the tubular outer sheath AM of the transmission element, i.e. the core member element designed in the form of a tube ZKR, exhibits a sufficient dimensioning. Advantageously, the outer sheath AM is constructed in a multilayer fashion, in this case, a soft inner layer and an outer layer which is harder than the inner layer are expediently provided for the core. In this way, the bending capability, flexibility and elasticity of the optical cable OC1 is sufficiently guaranteed should bending, torsional, tensile and compressive stresses occur, so that the optical waveguides LW1 to LWn remain unstressed in its center. On the other hand, the harder outer layer of the outer sheath AM imparts to the construction of the cable core firstly sufficient strength against transverse compressive forces. Expediently, a somewhat harder PE sheath compound is selected for the outer layer of the outer sheath AM but on the other hand a softer one for the inner layer. For cables which are introduced into buildings, in certain circumstances a flame retardant sheath mixture with EVA, and possibly also PVC or PU is selected.

If required, in the core member element designed as the tube ZKR it is possible to introduce, in place of the optical waveguides LW1 to LWn, also conventional electrical conductors or tensile elements such as for example steel or aramid wires. However, it is also possible to use this tube for example for the longitudinal conduction of compressed gas for the purposes of monitoring the optical cable OC2.

Figure 3:
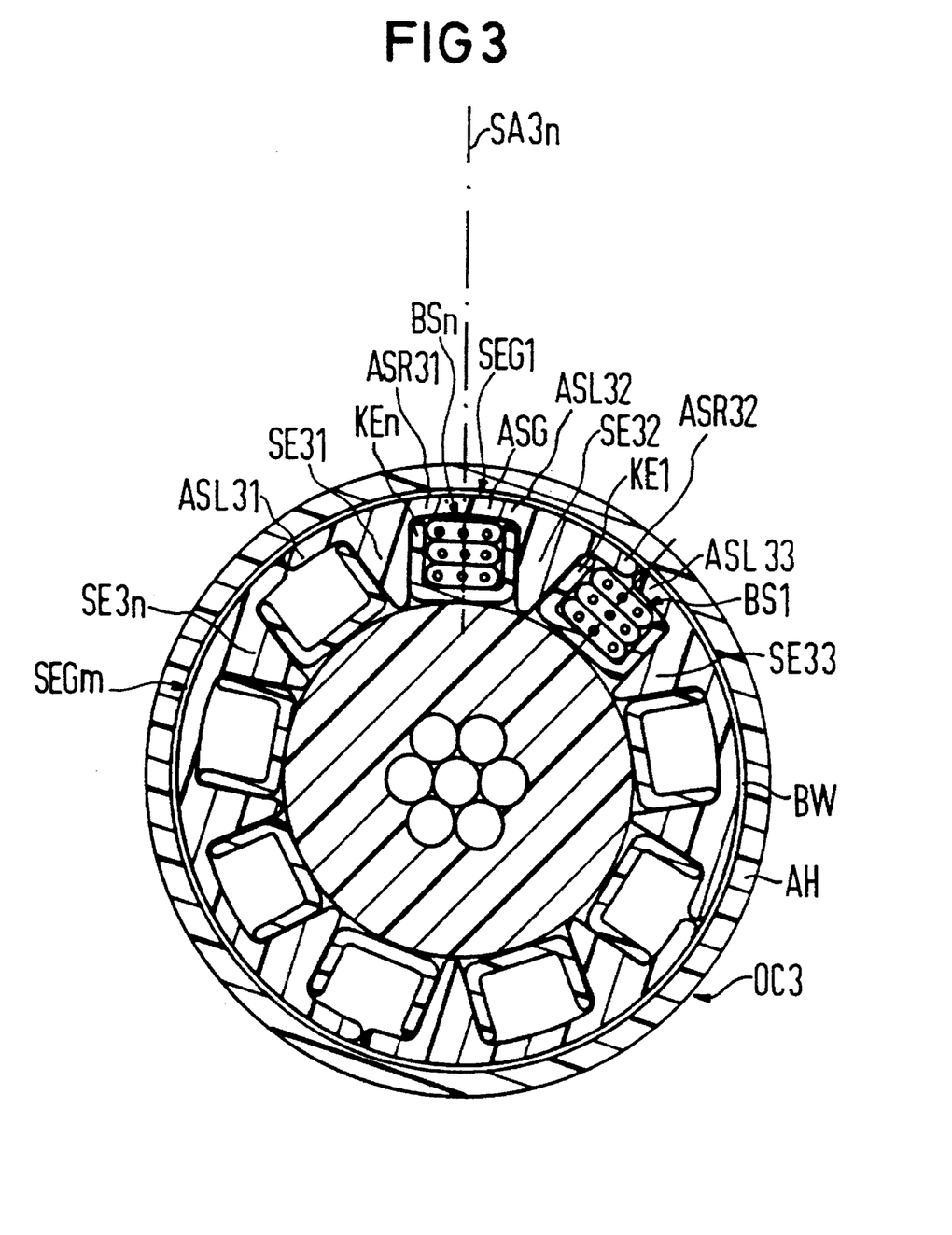
FIG. 3 shows, in cross section, a modification of the optical cable according to FIG. 1 with supporting elements designed in two parts.

FIG. 3 shows diagrammatically, and on an enlarged scale, in cross section, an optical cable OC3 having a form of supporting elements SE31 to SE3n which has been modified in relation to FIG. 1. Elements from FIG. 1 which have been used in unchanged form are provided with the same reference symbols as in FIG. 1. The supporting elements are inserted between the chamber elements KE1 to KEn (which are of the same construction as in FIGS. 1 and 2) disposed annularly in a layer, from the outside, and incorporated between the chamber elements.

In each instance one of the two symmetrical projections of a supporting element according to FIG. 1 is connected to in each instance one projection of an adjacent supporting element to form a bridge component. By way of example, in FIG. 3 the projection ASR31 of the supporting element SE31 and the projection ASL32 of the supporting element SE32 are brought together to form a continuous bridge component ASG. In this way, a new two component supporting element SEG1 is created. The supporting element exhibits in the middle part a U-shaped cross section and externally in each instance a projection ASL31 and ASR32. These two component supporting elements SEG1 to SEGm, with m=n/2, embrace in each instance in a boxlike fashion a chamber element KE1 to KEn, or extend over the latter. In this way, it is achieved that the number of impact positions of the projections is halved in comparison with FIG. 1.

If, for example, a radial compressive force acts along the plane of symmetry SA3n of the chamber element KEn, then the continuous bridge component ASG shields the strip stack BSn in the chamber element KEn against this radial force.

With the supporting elements shown in FIGS. 1–3, it is ensured that a tilting of these supporting elements is to a large extent avoided, even in the case of obliquely attacking load.

It is also possible to combine more than two supporting elements to form a multicomponent supporting element. By way of example, three supporting elements SE31 to SE33 can be connected by two common bridge components similar to ASG to form a three component supporting element. (For example, the projections ASR31 and ASL32 of the supporting elements SE31 and SE32 and the projections ASR32 and ASL33 of the supporting elements SE32 and SE33 can be combined.) In this way, the protective action of the covering can be further improved.

Figure 4:
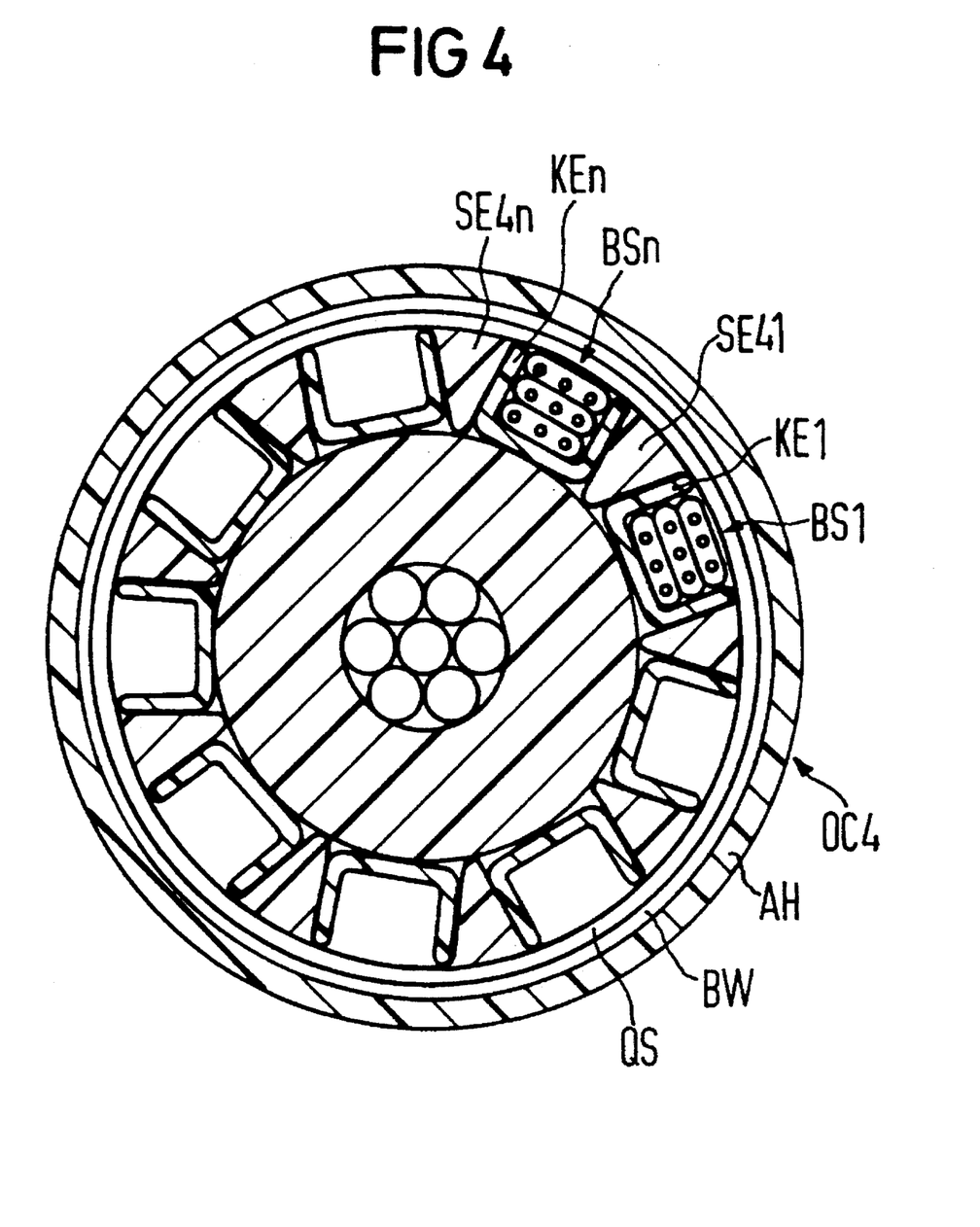
FIG. 4 shows, in cross section, a third modification of the optical cable according to FIG. 1 with supporting elements without projections.

FIG. 4 shows an optical cable OC4, which corresponds in its construction to that of the optical cable OC1 according to the invention, but exhibits altered supporting elements SE41 to SE4n. Elements which have been used in unchanged form from FIG. 1 are given the same reference symbols as in FIG. 1. The supporting elements SE41 to SE4n virtually entirely fill out the fillers between the chamber elements KE1 to KEn, and accordingly have approximately a wedge-shaped cross section. The outer walls are of the supporting elements SE41 to SE4n thus rest against the outer walls of the adjacent chamber elements (KE1 to KEn) in their full length. This gives optimal support for the filigree side walls of the chamber elements KE1 to KEn. This variant offers the advantage that the supporting elements SE41 to SE4n can be inserted in a particularly simple manner into the intermediate spaces, i.e. fillers, of the chamber elements KE1 to KEn from outside.

Expediently, the radially outwardly open chamber elements KE1 to KEn are covered over by an outer layer QS which is resistant to transverse pressure. This layer QS then corresponds approximately to the bridge component ASG according to FIG. 3. It may be expedient to connect this outer layer QS to the supporting elements SE41 to SE4n, e.g. by an intercalated adhesive melt layer, in order to retain the small strip stacks BS1 to BSn in the chamber elements KE1 to KEn in the event of stresses. Expediently, the same materials as explained in connection with FIG. 1 are to be selected as materials for the supporting elements SE41 to SE4n.

Figure 5:
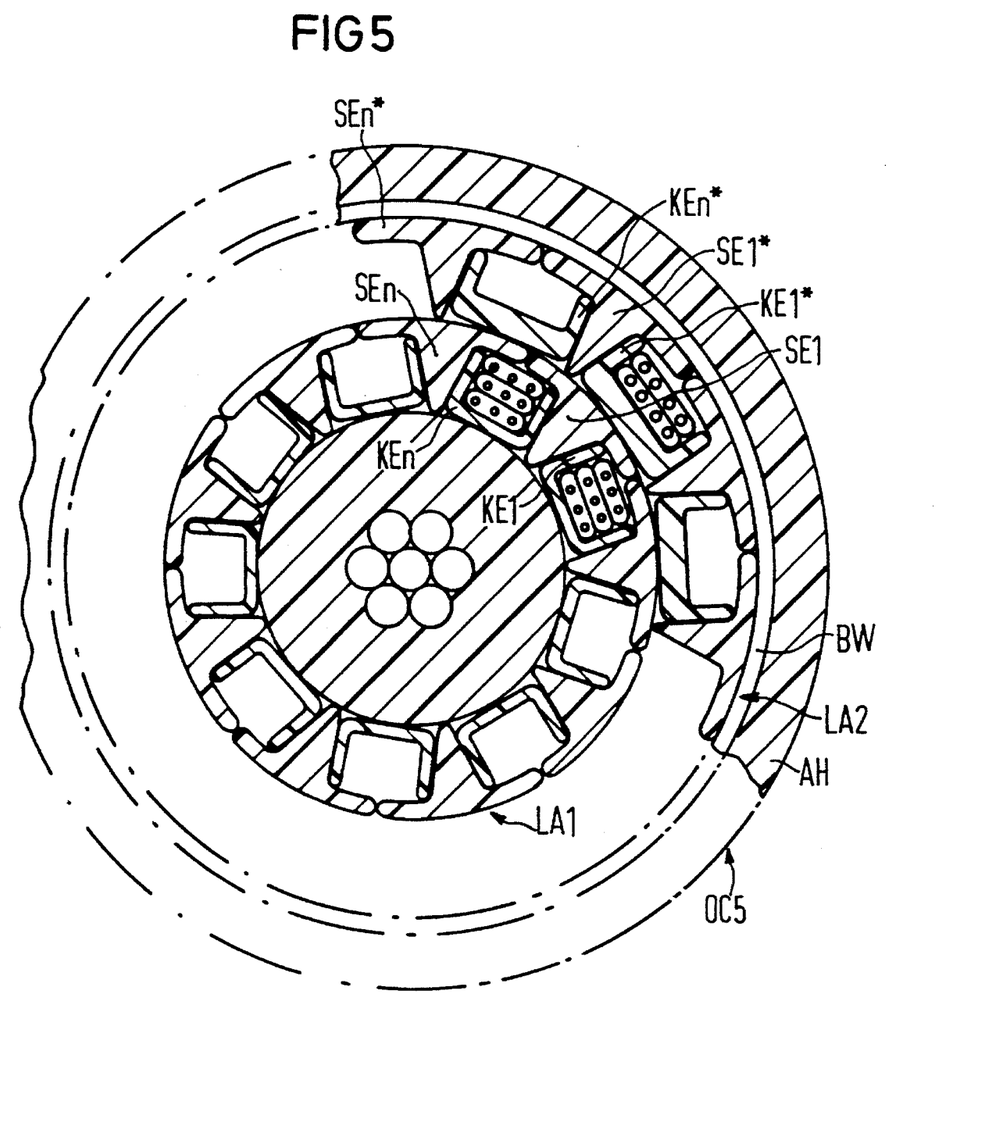
FIG. 5 shows, in cross section, an embodiment of an optical cable according to the invention with two layers of chamber elements and supporting elements lying there between, FIG. 6 shows, in diagrammatic representation, a device for carrying out the process according to the invention.

FIG. 5 shows an optical cable OC5 which is constructed in a two layer configuration. Its cable core exhibits an identical inner layer LA1 in a similar way to FIG. 1. Elements which have been taken over in unchanged form are provided with the same reference symbols. On this first inner layer LA1 there is applied a stranding layer LA2 which is constructed in similar quality with respect to supporting elements SE1* to SEn* and chamber elements KE1* to KEn*. Since the diameter of the second layer LA2 is greater than the diameter of the inner layer LA1, in the outer layer LA2 it is possible to use chamber elements KE1* to KEn* which are selected to be larger in cross section than the chamber elements KE1–KEn of the inner layer LA1. Likewise, the supporting elements SE1*–SEn* can be selected to be correspondingly larger than those (SE1–SEn) of the inner layer LA1.

Multilayer arrangements are expediently stranded in opposite directions, whereby a secured, progressive supporting of the supporting elements of the different layers is guaranteed. In this case, it is particularly favorable that in the case of the supporting elements provided with projections, a marked uniform distribution (a distribution over a larger base) of radial compressive stresses is also achieved.

Expediently, between the two layers LA1 and LA2 it is possible to draw in an intermediate layer as an additional covering for protection against crushing of the inner layer LA1.

Expediently, for differing diameters of layers of chamber elements, it is also possible to use differing supporting elements, which are designed in a single component or a multicomponent configuration. Thus, for example in the first layer LA1 it is possible to insert T-beam-shaped, single-component supporting elements similar to FIG. 1 and in the second stranding layer LA2, two-component, U-shaped supporting elements according to FIG. 3 between the chamber elements.

Figure 6:
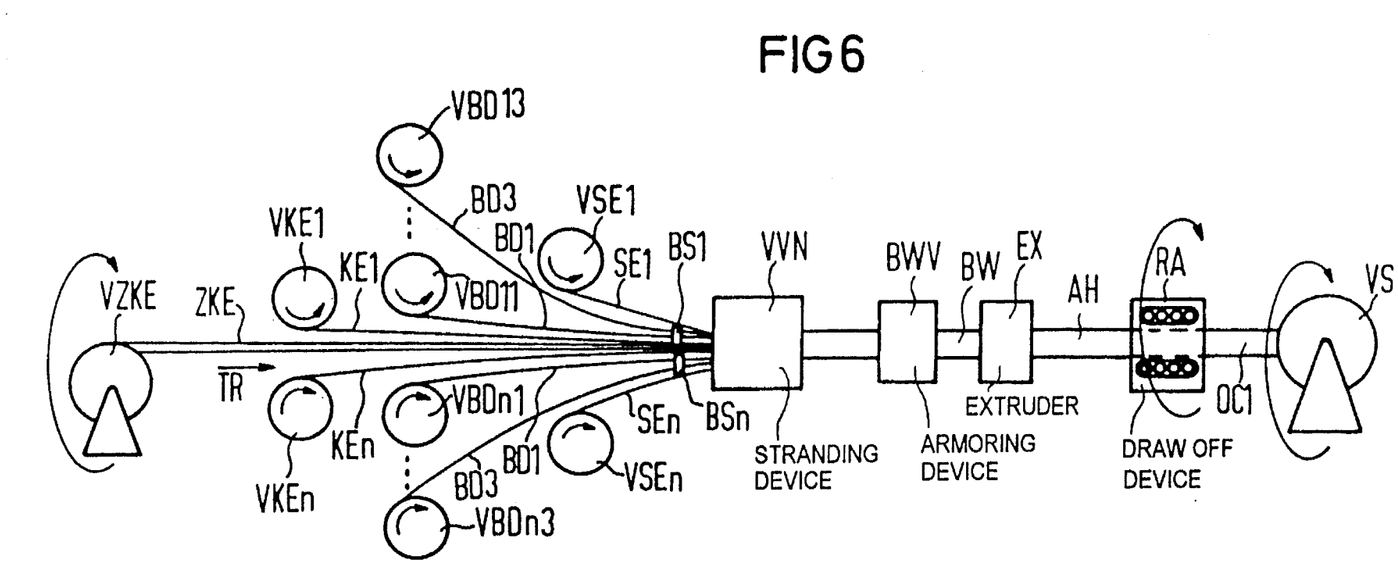

In FIG. 6, it is shown how an optical cable OC1 according to FIG. 1 can be manufactured. From a rotating supply spool VZKE, the central core member element ZKE is drawn off to the right in the direction of the arrow TR. For the annular stranding of the chamber elements KE1 to KEn onto the central core member element ZKE, their supply spools VKE1 to VKEn are disposed in rotationally symmetric fashion and stationary about the longitudinal axis of the central core member element ZKE. From the supply spools VKE1 to VKEn, the chamber elements KE1 to KEn are fed to a common stranding point in a device VVN (which is designed in a similar manner to a closer). At the same time, in a stationary annular arrangement in each instance optical waveguide strip lines BD1 to BD3 are drawn off about the longitudinal axis of the central core member element ZKE from supply spools (VBD11 to VBD13) to (VBDn1–VBDn3). These are in each instance combined to form rectangular strip stacks BS1 to BSn shortly ahead of the stranding point of the device VVN and are inserted directly, during the stranding of the chamber elements KE1 to KEn, into the latter. Simultaneously with the stranding process of the chamber elements KE1 to KEn, in a following third rotationally symmetric and stationary arrangement of supply spools VSE1 to VSEn the supporting elements SE1 to SEn are unwound and likewise fed to the common stranding point in the device VVN. The supporting elements SE1–SEn are inserted from outside between the fillers of the chamber elements KE1 to KEn. On this layer of chamber elements KE1 to KEn and on the incorporated supporting elements SE1 to SEn, it is possible to apply an armoring BW (e.g. of tensile elements such as glass fibers or aramid fibers) with a device BWV for additional mechanical protection against tensile, bending and torsional stresses. Finally, the layer, provided with the armoring BW, of chamber elements KE1 to KEn and the supporting elements SE1 to SEn inserted therebetween is run into the through bore of an extruder head of an extruder EX, in order to apply a possibly multilayer outer jacket AH. A downstream rotating track draw-off device RA embraces the thus manufactured optical cable OC1 with a positive fit and feeds the latter to a rotating take-up drum VS. Thus, the track draw-off device RA serves the purpose of drawing-off both the central core member element ZKE from its supply spool VZKE and also the stranding elements such as the chamber elements KE1 to KEn, in each instance the optical waveguide strip lines BD1 to BD3 and the supporting elements SE1 to SEn from their supply spools and feeding them to their common stranding point in the device VVN. In order to prevent torsion on the central core member element ZKE, the drums VZKE and VS rotate, as well as the track draw-off device RA in synchronism and in the same sense, i.e. the chamber elements KE1 to KEn with the supporting elements to be inserted therebetween are preferably stranded in opposite directions.

If required, the chamber elements KE1 to KEn can be stranded with the supporting elements SE1 to SEn to be inserted therebetween and also SZ. The two supply spools VZKE and VS are then stationary, for example, while the central element ZKE or the cable core rotates on a stranding path between a first additional track draw-off device corresponding to RA ahead of the stranding point and the track draw-off device RA with an alternating direction of application. Advantageously, these two track draw-off devices rotate approximately in synchronism. The additional track draw-off device has been omitted in FIG. 6, for the sake of clarity.

In place of the supply spools VSE1–VSEn, when using appropriate cooling devices it is also possible to provide an extruder with a multiple nozzles in this case, the nozzle openings correspond to the profile of the supporting elements SE1 to SEn.

Although other modifications and changes may be suggested by those skilled in the art, it is the intention of the inventors to embody within the patent warranted hereon all changes and modifications as reasonably and properly come within the scope of their contribution to the art.

I claim:

1. An optical cable for carrying optical waveguides, comprising:
   chamber elements forming autonomous elements disposed annularly with intermediate spaces therebetween in at least one layer and which serve to receive optical waveguides,
   autonomous supporting elements inserted into the intermediate spaces in said at least one layer between and adjacent said autonomous chamber elements, said supporting elements extending substantially radially, and a radial extent of said supporting elements exceeding a radial extent of said autonomous chamber elements and each supporting element having two projections extending in opposite directions with the projections of each supporting element respectively extending circumferentially over adjacent chamber elements.

2. An optical cable as claimed in claim 1, further comprising:
   a core member element about which said layer of chamber elements and said supporting elements are disposed annularly.

3. An optical cable as claimed in claim 2, wherein said core member element includes at least one tensile element.

4. An optical cable as claimed in claim 3, further comprising:
   a thickening layer applied to said tensile element.

5. An optical cable as claimed in claim 1, wherein said core member element is a tube.

6. An optical cable as claimed in claim 5, further comprising:
   at least one optical waveguide disposed in said tube.

7. An optical cable as claimed in claim 1, wherein said chamber elements are of a U-shaped profile in cross-section.

8. An optical cable as claimed in claim 1, wherein said chamber elements include substantially rectangular openings to receive the optical waveguides.

9. An optical cable as claimed in claim 1, wherein said chamber elements include chamber openings directed radially outwardly.

10. An optical cable as claimed in claim 1, further comprising:
    at least one optical waveguide strip line inserted into said chamber.

11. An optical cable as claimed in claim 10, wherein said at least one optical waveguide strip line is a stack of a plurality of optical waveguide strip lines inserted into said chamber elements.

12. An optical cable as claimed in claim 1, wherein said chamber elements have a radial extent of at least approximately 1 mm, and an extent along a circumference of at least approximately 2 mm.

13. An optical cable as claimed in claim 1, wherein said chamber elements is of a wall thickness of between approximately 0.3 mm and 1 mm.

14. An optical cable as claimed in claim 1, wherein said supporting elements is of a radial extent of that is selected substantially greater than a wall thickness of said supporting elements.

15. An optical cable as claimed in claim 1, wherein said supporting elements are of a substantially smaller wall width than an extent of said chamber elements in a circumferential direction.

16. An optical cable as claimed in claim 1, wherein a wall thickness of said supporting elements is between approximately 0.5 mm and 2 mm.

17. An optical cable as claimed in claim 1, wherein outer walls of said supporting elements touch outer walls of adjacent ones of said chamber elements.

18. An optical cable as claimed in claim 17, wherein said outer walls of said supporting elements rest against said outer walls of said adjacent chamber elements along their full length.

19. An optical cable as claimed in claim 18, wherein said supporting elements substantially fill out a region between said chamber elements.

20. An optical cable as claimed in claim 1, wherein a wall thickness of said supporting elements increases in a radially outward direction.

21. An optical cable as claimed in claim 1, wherein said supporting elements fill out only partially a region between said chamber elements.

22. An optical cable as claimed in claim 1, wherein said supporting elements are of a harder material than a material of said chamber elements.

23. An optical cable as claimed in claim 1, further comprising:
    at least one transversely extending projection on each of said supporting elements.

24. An optical cable as claimed in claim 23, wherein each of said supporting elements include two projections extending in opposite directions.

25. An optical cable as claimed in claim 24, wherein said two projections are disposed symmetrically with respect to a radial extent of said supporting elements.

26. An optical cable as claimed in claim 23, wherein said projections extend to cover openings of said chamber elements.

27. An optical cable as claimed in claim 23, wherein at least two of said projections form a continuous bridge component.

28. An optical cable as claimed in claim 23, wherein said projections abut one another in a circumferential direction.

29. An optical cable as claimed in claim 23, wherein a wall thickness of said projections is between approximately 0.5 mm and 2 mm.

30. An optical cable as claimed in claim 1, further comprising:

a plurality of layers of chamber elements and supporting elements.

31. An optical cable as claimed in claim 30, further comprising:

an intermediate layer on each layer of said chamber elements and said supporting elements.

32. An optical cable as claimed in claim 30, wherein said supporting elements are designed differently in various layers.

33. An optical cable as claimed in claim 1, further comprising:

at least one outer jacket about an external surface of said optical cable.

34. An optical cable as claimed in claim 1, wherein radially extending middle parts of said supporting elements exhibit differing mechanical properties within their cross section.

35. An optical cable as claimed in claim 1, wherein said supporting elements are fixed with said core member element at a foot regions.

36. A process for the manufacture of an optical cable, comprising the steps of:

providing a plurality of autonomous chamber elements, a plurality of autonomous supporting elements, each supporting element having oppositely extending projections, and a plurality of waveguide strips lines;

positioning said chamber elements annularly with intermediate spaces therebetween in at least one stranding layer, inserting said optical waveguide strip lines into said chamber elements as a stack, inserting said supporting elements from outside extending radially in said spaces between and adjacent said chamber elements with one projection from each supporting element extending over each adjacent chamber element to at least partially cover said stack in said chamber element.

37. A process as claimed in claim 36, further comprising the step of:

applying at least one outer jacket externally to said optical cable by extrusion.

* * * * *